(12) United States Patent
Cali

(10) Patent No.: US 12,029,257 B2
(45) Date of Patent: Jul. 9, 2024

(54) CASE WITH A ROTATABLE HOLDER FOR AN AEROSOL-GENERATING DEVICE

(71) Applicant: Philip Morris Products S.A., Neuchatel (CH)

(72) Inventor: Ricardo Cali, Mannheim (DE)

(73) Assignee: Philip Morris Products S.A., Neuchatel (CH)

( * ) Notice: Subject to any disclaimer, the term of this patent is extended or adjusted under 35 U.S.C. 154(b) by 422 days.

(21) Appl. No.: 17/440,310

(22) PCT Filed: Mar. 19, 2020

(86) PCT No.: PCT/EP2020/057674
§ 371 (c)(1),
(2) Date: Sep. 17, 2021

(87) PCT Pub. No.: WO2020/193374
PCT Pub. Date: Oct. 1, 2020

(65) Prior Publication Data
US 2022/0142263 A1 May 12, 2022

(30) Foreign Application Priority Data
Mar. 22, 2019 (EP) ..................................... 19164747

(51) Int. Cl.
*A24F 40/95* (2020.01)
*H02J 7/00* (2006.01)
(52) U.S. Cl.
CPC ............ *A24F 40/95* (2020.01); *H02J 7/0044* (2013.01); *H02J 7/007188* (2020.01)
(58) Field of Classification Search
CPC ........... A24F 40/95; A24F 40/50; A24F 40/00
See application file for complete search history.

(56) References Cited

U.S. PATENT DOCUMENTS 9,220,304 B2 * 12/2015 Greim .................... A24F 40/85
9,320,299 B2 * 4/2016 Hearn .................... A61M 15/06
(Continued)

FOREIGN PATENT DOCUMENTS

CN 107105777 A 8/2017
CN 109068757 A 12/2018
(Continued)

OTHER PUBLICATIONS

Combined Russian Office Action and Search Report dated May 17, 2023 in Russian Patent Application No. 2021130619/03 (with English Translation), citing references 15 and 16 therein, 11 pages.
International Search Report and Written Opinion dated Jul. 3, 2020 in PCT/EP2020/057674 filed Mar. 19, 2020, 3 pages.
Chinese Notice of allowance and Search report mailed on Jan. 2, 2024, issued in Chinese Patent Application No. 202080017100.9 filed on Mar. 19, 2020, with English Translation, total 9 pages.
(Continued)

*Primary Examiner* — Harshad C Patel
(74) *Attorney, Agent, or Firm* — Oblon, McClelland, Maier & Neustadt, L.L.P.

(57) ABSTRACT

A case for an aerosol-generating device is provided, including: a case housing; a holder to receive the device and being movable with respect to the case housing between a closed position in which removal of the device from the holder is prevented and a docking position in which the device is removable; a case power supply within the case housing; a case electrical connector to supply power to the device received within the holder; a charging connector to receive power from an external power supply; a sensor to sense a position of the holder and to generate a signal indicative of the position; and a controller to receive the signal from the sensor, supply power to the case power supply when the signal indicates the holder is the closed position, and supply power when the signal indicates the holder is in the docking position. A charging system is also provided.

13 Claims, 15 Drawing Sheets

(56) References Cited

U.S. PATENT DOCUMENTS

| | | | |
|---|---|---|---|
| 10,130,780 B2* | 11/2018 | Talon | A24F 40/53 |
| 11,445,576 B2* | 9/2022 | Zinovik | B32B 27/281 |
| 11,622,582 B2* | 4/2023 | Lim | A24F 40/51 |
| | | | 131/273 |
| 11,627,759 B2* | 4/2023 | Han | A24D 3/17 |
| | | | 131/329 |
| 11,728,664 B2* | 8/2023 | Holzherr | H02J 7/0045 |
| | | | 131/329 |
| 2009/0283103 A1 | 11/2009 | Nielsen et al. | |
| 2014/0366900 A1 | 12/2014 | Plojoux et al. | |
| 2016/0050975 A1 | 2/2016 | Worm et al. | |
| 2016/0366946 A1* | 12/2016 | Murison | B67D 7/02 |
| 2017/0258133 A1 | 9/2017 | Ampolini et al. | |
| 2018/0116354 A1 | 5/2018 | Fernando et al. | |
| 2018/0160741 A1 | 6/2018 | Worm et al. | |
| 2020/0006950 A1* | 1/2020 | Holzherr | H02J 7/00 |

FOREIGN PATENT DOCUMENTS

| | | |
|---|---|---|
| GB | 2523585 A8 | 9/2015 |
| RU | 2 602 962 C2 | 11/2016 |
| WO | WO 2018/190590 A2 | 10/2018 |
| WO | WO 2018/202732 A1 | 11/2018 |
| WO | WO 2018/217030 A1 | 11/2018 |
| WO | WO 2020/141064 A1 | 7/2020 |

OTHER PUBLICATIONS

Japanese Notice of Allowance mailed on Apr. 1, 2024, issued in Japanese Patent Application No. 2021-552201 filed on Mar. 19, 2020, with English Translation, total 3 pages.

* cited by examiner

CASE WITH A ROTATABLE HOLDER FOR AN AEROSOL-GENERATING DEVICE

The present invention relates to a case having a rotatable holder for receiving an aerosol-generating device. The present invention also relates to a charging system comprising the case and a docking station.

Known electrically operated aerosol-generating systems generally comprise an aerosol-generating device having an atomiser and an electrical power supply for supplying power to the atomiser. The atomiser may be an electric heater. Known systems also generally comprise an aerosol-forming substrate which is received by the device and atomised by the atomiser to release volatile compounds in the aerosol-forming substrate which form an aerosol for inhalation by a user. Some known systems also comprise a case for receiving the aerosol-generating device when not in use. Cases in different systems are known to provide different functions, such as protecting the device when not in use and recharging the battery of the device.

In some known aerosol-generating systems, the aerosol-generating device is configured to receive an aerosol-generating article comprising a solid aerosol-forming substrate, such as a gathered, crimped sheet of tobacco. In these systems, the device typically comprises an atomiser in the form of an electric heater arranged to heat the aerosol-forming substrate and a power supply for supply power to the electric heater. To maintain the device at a desired size, typically the power supply in the aerosol-generating device has sufficient capacity for heating only a single aerosol-forming substrate. Therefore, in systems comprising a case, once the device has been used with a single aerosol-generating article the device must be inserted into the case and re-charged before use with a further article.

As an alternative to re-charging the device using the case, some users choose to use a docking station that receives the device and provides power from an external power supply. Although the docking station may provide convenient access to the device when sitting at a desk, for example, the user must continue to use the case for re-charging the device when away from the docking station. Therefore, in known aerosol-generating systems, the use of a docking station in addition to the case presents the user with additional cost and may also require the user to carry both the case and the docking station when the user wishes to use the docking station in a number of different locations.

It would be desirable to overcome or mitigate at least some of these disadvantages with known aerosol-generating systems and docking stations.

According to a first aspect of the present invention there is provided a case for an aerosol-generating device, the case comprising a case housing and a holder for receiving an aerosol-generating device. The holder is arranged to move with respect to the case housing between a closed position in which removal of an aerosol-generating device from the holder is prevented and a docking position in which an aerosol-generating device may be removed from the holder. The case also comprises a case power supply positioned within the case housing and a case electrical connector arranged to supply power to an aerosol-generating device when the aerosol-generating device is received within the holder. The case also comprises a charging connector for receiving power from an external power supply and a sensor arranged to sense the position of the holder and generate a signal indicative of the position of the holder. The case also comprises a controller arranged to receive the signal from the sensor. The controller is configured to supply power received by the charging connector from an external power supply to the case power supply when the signal is indicative of the holder being in the closed position. The controller is configured to supply power received by the charging connector from an external power supply to the case electrical connector when the signal is indicative of the holder being in the docking position.

Advantageously, supplying power received from an external power supply directly to the case electrical connector when the holder is in the docking position may facilitate direct re-charging of a device power supply of an aerosol-generating device received within the holder when the case is being used as a docking station. Advantageously, this may reduce wear on the case power supply.

Advantageously, supplying power to the case power supply when the holder is in the closed position facilitates re-charging of the case power supply when the case is not being used as a docking station.

The holder may be arranged to rotate through an angle of between 80 degrees and 110 degrees with respect to the case housing when the holder moves between the closed position and the docking position. Advantageously, this may facilitate use of the case as a docking station. For example, when the holder is in the docking position, the case housing may function as a base to allow the case to stand on a flat surface and the holder may extend away from the flat surface to facilitate convenient insertion of an aerosol-generating device into the holder and removal of the aerosol-generating device from the holder.

Preferably, the holder is arranged to rotate through an angle of between about 85 degrees and about 105 degrees with respect to the case housing when the holder moves between the closed position and the docking position. Preferably, the holder is arranged to rotate through an angle of about 90 degrees with respect to the case housing when the holder moves between the closed position and the docking position. Advantageously, an angle of about 90 degrees may maximise the stability of the case when used as a docking station with the holder in the docking position. Advantageously, an angle of about 90 degrees may increase or maximise the contact area between the case housing and a surface on which the case is rested while allowing the holder to extend substantially vertically with respect to the surface to facilitate use of the case as a docking station.

Preferably, the holder has a longitudinal axis. Preferably, the holder is arranged for insertion of an aerosol-generating device into the holder along the longitudinal axis when the holder is in the docking position. Preferably, the holder is arranged for rotational movement between the closed position and the docking position about a rotational axis, wherein the rotational axis is substantially perpendicular to the longitudinal axis of the holder.

According to a second aspect of the present invention there is provided a case for an aerosol-generating device. The case comprises a case housing and a holder for receiving an aerosol-generating device. The holder is arranged to move with respect to the case housing between a closed position in which removal of an aerosol-generating device from the holder is prevented and aa docking position in which an aerosol-generating device may be removed from the holder. The holder is arranged to rotate through an angle of between about 80 degrees and about 110 degrees with respect to the case housing when the holder moves between the closed position and the docking position. The case also comprises a case power supply positioned within the case housing and a case electrical connector arranged to supply power from the case power supply to an aerosol-generating device when the aerosol-generating device is received within the holder.

The holder is arranged to rotate through an angle of between about 80 degrees and about 110 degrees with respect to the case housing when the holder moves between the closed position and the docking position. Advantageously, this may facilitate use of the case as a docking station. For example, when the holder is in the docking position, the case housing may function as a base to allow the case to stand on a flat surface and the holder may extend away from the flat surface to facilitate convenient insertion of an aerosol-generating device into the holder and removal of the aerosol-generating device from the holder.

Preferably, the holder is arranged to rotate through an angle of between about 85 degrees and about 105 degrees with respect to the case housing when the holder moves between the closed position and the docking position. Preferably, the holder is arranged to rotate through an angle of about 90 degrees with respect to the case housing when the holder moves between the closed position and the docking position. Advantageously, an angle of about 90 degrees may maximise the stability of the case when used as a docking station with the holder in the docking position. Advantageously, an angle of about 90 degrees may increase or maximise the contact area between the case housing and a surface on which the case is rested while allowing the holder to extend substantially vertically with respect to the surface to facilitate use of the case as a docking station.

Preferably, the holder has a longitudinal axis. Preferably, the holder is arranged for insertion of an aerosol-generating device into the holder along the longitudinal axis when the holder is in the docking position. Preferably, the holder is arranged for rotational movement between the closed position and the docking position about a rotational axis, wherein the rotational axis is substantially perpendicular to the longitudinal axis of the holder.

Preferably, the case according to the second aspect of the present invention comprises a charging connector for receiving power from an external power supply, wherein the charging connector is arranged to supply power received from an external power supply to at least one of the case power supply and the case electrical connector. Advantageously, power received by the charging connector from an external power supply may be used to recharge at least one of the case power supply and a device power supply of an aerosol-generating device received within the holder.

The case according to the second aspect of the present invention may comprise a sensor arranged to sense the position of the holder and generate a signal indicative of the position of the holder. The case may comprise a controller arranged to receive the signal from the sensor.

Preferably, the controller is configured to supply power received by the charging connector from an external power supply to the case power supply when the signal is indicative of the holder being in the closed position. Advantageously, supplying power to the case power supply when the holder is in the closed position facilitates re-charging of the case power supply when the case is not being used as a docking station.

Preferably, the controller is configured to supply power received by the charging connector from an external power supply to the case electrical connector when the signal is indicative of the holder being in the docking position. Advantageously, supplying power received from an external power supply directly to the case electrical connector when the holder is in the docking position may facilitate direct re-charging of a device power supply of an aerosol-generating device received within the holder when the case is being used as a docking station. Advantageously, this may reduce wear on the case power supply.

The following optional and preferred features may be applied to cases according to both the first aspect of the present invention and the second aspect of the present invention.

The case electrical connector may be arranged to supply power from the case power supply to an aerosol-generating device when the aerosol-generating device is received within the holder and when the holder is in each of the docking position and the closed position. Advantageously, supplying power from the case power supply to an aerosol-generating device when the holder is in the closed position facilitates re-charging of the aerosol-generating device when the case is being used as a case for transporting the aerosol-generating device. Advantageously, supplying power from the case power supply to an aerosol-generating device when the holder is in the docking position facilitates re-charging of the aerosol-generating device when the case is being used as docking station, particularly when the case is not connected to an external power supply.

Preferably, the case is arranged so that at least part of the holder is received within the housing when the holder is in the closed position. Advantageously, this may facilitate enclosing an aerosol-generating device inside the case when the aerosol-generating device is received within the holder and the holder is in the closed position. Advantageously, enclosing the aerosol-generating device inside the case may protect the aerosol-generating device when the aerosol-generating device is not being used.

Preferably, the holder is rotatable with respect to the case housing into an open position between the closed position and the docking position. Advantageously, the open position may allow insertion of an aerosol-generating device into the holder and removal of an aerosol-generating device from the holder without requiring movement of the holder through a full range of motion between the closed position and the docking position. The open position may be particularly advantageous when the case is being used as a case for transporting the aerosol-generating device.

Preferably, the case comprises a hinge, wherein the holder is rotatable about the hinge with respect to the case housing. The holder may be connected to the case housing by the hinge. The holder may be moveable about the hinge between the docking and closed positions. Advantageously, connecting the holder to the case housing by the hinge may facilitate simple construction of the case and simple operation of the holder. For example, the hinge allows a user to simply rotate the holder about the hinge between the closed position and the docking position.

In embodiments in which the holder is rotatable into an open position, the holder may be rotatable about the hinge into the open position.

The hinge may comprise at least one projection on the holder and at least one aperture defined by the case housing, wherein the at least one projection is rotatably received within the at least one aperture.

The hinge may comprise at least one projection on the case housing and at least one aperture defined by the holder, wherein the at least one projection is rotatably received within the at least one aperture.

Advantageously, forming the hinge using at least one projection and at least one aperture may facilitate simple and cost-effective manufacture of the case. For example, in embodiments in which at least one of the case housing and the holder is formed using an injection moulding process or a 3D printing process, the at least one projection and the at least one aperture may be formed during the injection moulding process or the 3D printing process.

The case may comprise a linkage having a first end and a second end, wherein the linkage is movably connected to the case housing at the first end of the linkage, and wherein the holder is pivotably connected to the second end of the linkage.

Advantageously, the linkage may facilitate a more complex movement of the holder with respect to the case housing. Advantageously, a more complex movement of the holder with respect to the housing may facilitate optimisation of the orientation of the holder relative to the case housing when the case is used as a docking station with the holder in the docking position.

The linkage and the holder may be arranged to provide both a translational movement of the holder with respect to the case housing and a rotational movement of the holder with respect to the case housing when the holder is moved between the closed position and the docking position.

The linkage may comprise at least one of a rod and a plate.

Preferably, the first end of the linkage is slidably connected to the case housing. Advantageously, a sliding motion provided by the linkage may facilitate movement of the holder entirely outside of the case housing when the holder is moved out of the closed position. Advantageously, moving the holder entirely outside of the case housing may facilitate an optimised orientation of the holder with respect to the case housing when the holder is rotated into the docking position.

The case housing may define at least one slot and the first end of the linkage may comprise at least one projection, wherein the at least one projection is slidably received within the at least one slot.

The holder may be connected to the second end of the linkage by a hinge. In embodiments in which the holder is movable into an open position, advantageously, the hinge may allow movement of the holder with respect to the linkage between the closed position and the open position.

The linkage may comprise a shaft, wherein the shaft comprises a first shaft portion defining the first end of the linkage and a second shaft portion defining the second end of the linkage. The second shaft portion is rotatably connected to the first shaft portion. Advantageously, rotation of the second shaft portion relative to the first shaft portion may allow rotation of the holder into the docking position. Rotation of the second shaft portion relative to the first shaft portion may be particularly advantageous in embodiments in which the holder is connected to the second end of the linkage by a hinge. Advantageously, the combination of a hinge and a rotational second shaft portion may provide the holder with two rotational degrees of freedom. Advantageously, two rotational degrees of freedom may facilitate an optimised orientation of the holder with respect to the case housing when the holder is rotated into the docking position. Advantageously, this may increase or maximise the contact area between the case housing and a surface on which the case is rested while allowing the holder to extend substantially vertically with respect to the surface to facilitate use of the case as a docking station.

The holder may be connected to the second end of the linkage by a universal joint. Advantageously, a universal joint may provide the holder with two rotational degrees of freedom. Advantageously, two rotational degrees of freedom may facilitate an optimised orientation of the holder with respect to the case housing when the holder is rotated into the docking position.

The holder may be connected to the second end of the linkage by a ball joint. Advantageously, a ball joint may provide the holder with three rotational degrees of freedom. Advantageously, three rotational degrees of freedom may facilitate an optimised orientation of the holder with respect to the case housing when the holder is rotated into the docking position.

The case electrical connector may be any suitable type of electrical connector for electrically connecting to an aerosol-generating device received in the holder. The case electrical connector may comprise any suitable number of electrical contacts. Preferably, the case electrical connector comprises a plurality of electrical contacts.

The case electrical connector is configured to transfer power to an aerosol-generating device received in the holder. The case electrical connector may have at least one power electrical contact arranged to transfer electrical power. The case electrical connector may have at least one data electrical contact arranged to transfer data to an aerosol-generating device received within the holder, transfer data from an aerosol-generating device received within the holder, or both.

Preferably, the case electrical connector is positioned on the holder. Advantageously, this facilitates electrical connection to an aerosol-generating device received within the holder when the holder is in the docking position and when the holder is in the closed position. The holder may comprise a first end through which an aerosol-generating device may be inserted into the holder and a second end at which the case electrical connector is positioned.

Preferably, the case comprises a flexible connector providing an electrical connection between the case electrical connector and the case power supply. Advantageously, the flexible connector accommodates the relative movement between the holder and the case housing. The flexible connector may comprise an electrical lead. The flexible connector may comprise a ribbon cable.

The charging connector may comprise any suitable connector for connecting the case power supply to an external power supply. The charging connector may comprise a connector compliant with a universal serial bus (USB) standard. The charging connector may comprise a micro-USB connector. The charging connector may comprise a USB-C connector.

The sensor may comprise at least one of a mechanical switch, an optical sensor, an inductive sensor, a magnetic sensor, and a capacitive sensor.

The sensor may be arranged at any suitable location on or in the case to detect relative positions of the holder and the case housing. In some embodiments, the sensor may be arranged on or in the holder and may be configured to sense the position of the case housing or one or more of the components housed within the case housing relative to the holder. In some preferred embodiments, the sensor may be arranged on or in the case housing and configured to sense the position of the holder relative to the case housing. In some particularly preferred embodiments, the sensor may be arranged to sense the presence of an aerosol-generating device within the holder. For example, the sensor may be arranged to detect the aerosol-generating device when the device is received in the holder and the holder is in the closed position.

The optical sensor may be an optical proximity sensor comprising a light source and an optical transducer arranged to receive reflected light from the light source when an object is arranged near or in the vicinity of the sensor. Preferably, the optical proximity sensor is an infra-red proximity sensor. An infra-red proximity sensor may utilise a light source which emits light in the infrared range of the electromagnetic spectrum, typically having wavelengths within the range of about 700 nanometres to about 1100 nanometres.

The mechanical switch may comprise a button or a lever that is movable to open or close an electric circuit. The switch may be moveable between an open position and a closed position. The switch may be biased to one of the open or closed positions. In other words, the switch may be urged to return to one of the open or closed positions in the absence of an external force in the opposite direction. In some embodiments, the switch may be a push-button switch. As used herein, a push-button switch refers to a switch comprising a button that is movable linearly along an axis between an open position and a closed position. In some embodiments, the switch may be a toggle switch or lever switch. As used herein, a toggle switch or lever switch refers to a switch comprising a lever that is movable, generally rotatable, between an open position and a closed position.

Preferably, the mechanical switch is arranged to be actuated by movement of the holder relative to the case between the docking position and the closed position.

In some embodiments, the mechanical switch is arranged on or within the holder. In these embodiments, the case housing or one or more of the components housed within the case housing may comprise a switch engaging portion configured to actuate the switch when the holder is moved between the docking position and the closed position. In some of these embodiments, the switch engaging portion may comprise a protrusion from the case housing or a shaping of the case housing that contacts and actuates the switch on movement of the holder relative to the case housing.

In some preferred embodiments, the mechanical switch is arranged on or within the case housing. In these embodiments, the holder may comprise a switch engaging portion adapted to actuate the switch when the holder is moved between the docking position and the closed position. In some of these embodiments, the switch engaging portion may comprise a protrusion from the holder or a shaping of the holder that contacts and actuates the switch on movement of the holder relative to the case housing.

The case power supply may be any suitable type of electrical power supply. For example, the case power supply may comprise one or more batteries and capacitors. The case power supply may comprise a lithium ion battery. Preferably, the case power supply is a rechargeable electrical power supply.

The case may further comprise a retention means arranged to releasably retain an aerosol-generating device within the holder. The retention means may be any suitable means for releasably retaining the aerosol-generating device in the holder.

The retention means may comprise a friction fit between the aerosol-generating device and the holder.

The retention means may comprise magnetic retention means. The magnetic retention means may comprise a first magnetic material and a second magnetic material. The first magnetic material may be provided in the aerosol-generating device and the second magnetic material may be provided in the case.

The first and second magnetic materials may be arranged such that the first and second magnetic materials are proximate each other when the aerosol-generating device is received within the holder. Preferably, the first and second magnetic materials may be arranged such that the first and second magnetic materials are attracted to each other when the aerosol-generating device is received within the holder.

The first magnetic material may be arranged at or towards an end of an aerosol-generating device and the second magnetic material may be arranged at or towards an end of the holder. In embodiments in which the case electrical connector is positioned at an end of the holder, the second magnetic material may be arranged adjacent the case electrical connector. The case electrical connector may comprise the second magnetic material.

The case may have any suitable size and shape for receiving an aerosol-generating device. Typically, the case is portable. In other words, the case has a suitable size and shape to be carried by a user. Preferably, the case is a handheld case. In other words, the case has a suitable size to be held in a hand of a user. The case may have a size and shape similar to a conventional packet of cigarettes. The case may have any suitable diameter and any suitable length. The case may have a length between about 50 millimetres and about 200 millimetres. The case may have an external diameter between about 10 millimetres and about 50 millimetres.

The case may have a transverse cross-section of any suitable shape. For example, the case may have a substantially circular, elliptical, triangular, square, rhomboidal, trapezoidal, pentagonal, hexagonal or octagonal transverse cross-section. The case may have a substantially rectangular transverse cross-section. The case may have a substantially constant transverse cross-section along its length. The case may have a substantially rectangular transverse cross-section along its length. In particular embodiments, the case may be a substantially rectangular cuboid.

The case housing and the holder may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

According to a third aspect of the present invention there is provided a charging system comprising a charging cradle and a case according to the first aspect of the present invention in accordance with any of the embodiments described herein, or a case according to the second aspect of the present invention in accordance with any of the embodiments described herein. The charging cradle is arranged to receive at least part of the case. The charging cradle comprises a charging cradle power supply connector for receiving power from an external power supply. The charging cradle also comprises a charging cradle electrical connector arranged to supply power received by the charging cradle power supply connector from an external power supply to the charging connector of the case when at least part of the case is received within the charging cradle. Preferably, the charging cradle is configured to receive at least part of the case when the holder is in the docking position.

Advantageously, the charging cradle may simplify the transfer of power from an external power supply to the case. For example, the charging cradle may remain permanently connected to an external power supply and the case may be easily inserted into the cradle and removed from the cradle as needed.

Advantageously, the charging cradle may facilitate use of the case as a docking station in embodiments in which the case housing comprises one or more curved portions. The charging cradle may comprise a substantially flat portion for resting on flat surface and a shaped portion shaped to receive at least part of the case housing. Preferably, the shaped portion of the cradle and at least part of the case housing have complementary shapes. In embodiments in which the case housing comprises one or more curved portions, preferably the shaped portion of the cradle has a curved shape.

Advantageously, since the case may be used as a docking station for an aerosol-generating device when the holder is in the docking position, it is not necessary to configure the charging cradle to receive an aerosol-generating device. Therefore, the charging cradle configured to receive at least part of the case may have a more simple construction when compared to known docking stations for receiving and re-charging an aerosol-generating device.

The charging cradle may have a cross-sectional shape corresponding to a cross-sectional shape of at least part of the case. The charging cradle may have a U-shaped cross-sectional shape.

Each of the charging cradle power supply connector and the charging cradle electrical connector may comprise any suitable connector. Each of the charging cradle power supply connector and the charging cradle electrical connector may comprise a connector compliant with a universal serial bus (USB) standard. Each of the charging cradle power supply connector and the charging cradle electrical connector may comprise a micro-USB connector. Each of the charging cradle power supply connector and the charging cradle electrical connector may comprise a USB-C connector.

The invention will be further described, by way of example only, with reference to the accompanying drawings, in which.

Figure 1:
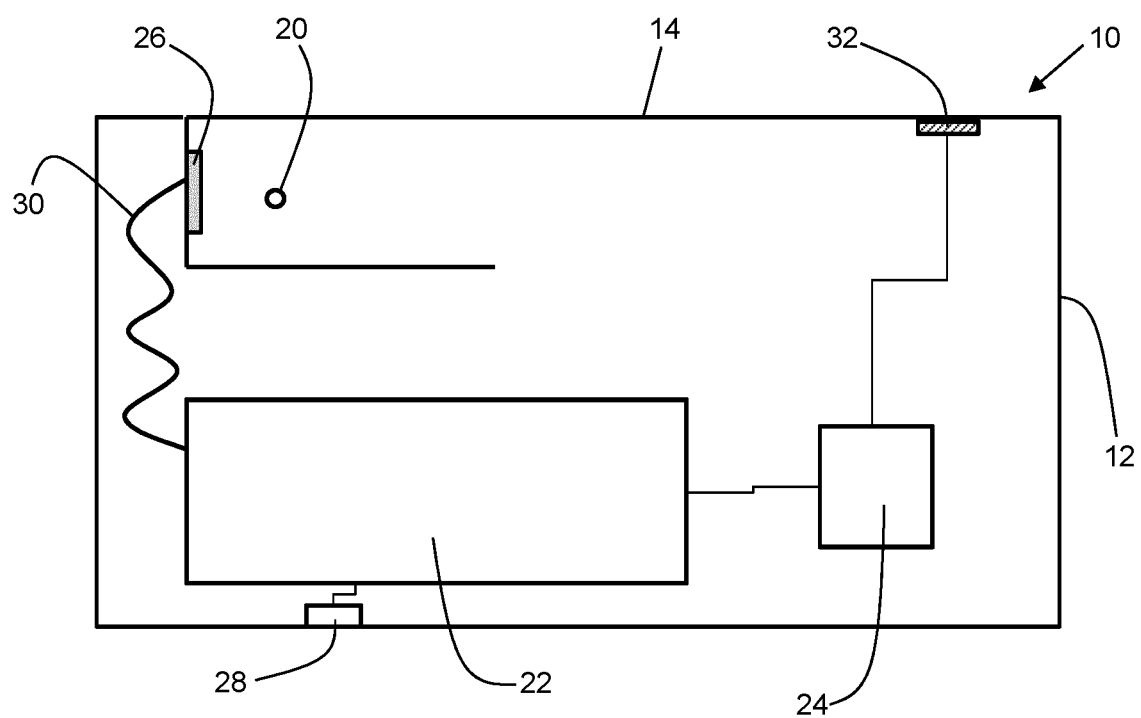
FIG. 1 shows a cross-sectional view of a case in accordance with a first embodiment of the present invention and with the holder in the closed position.
Figure 2:
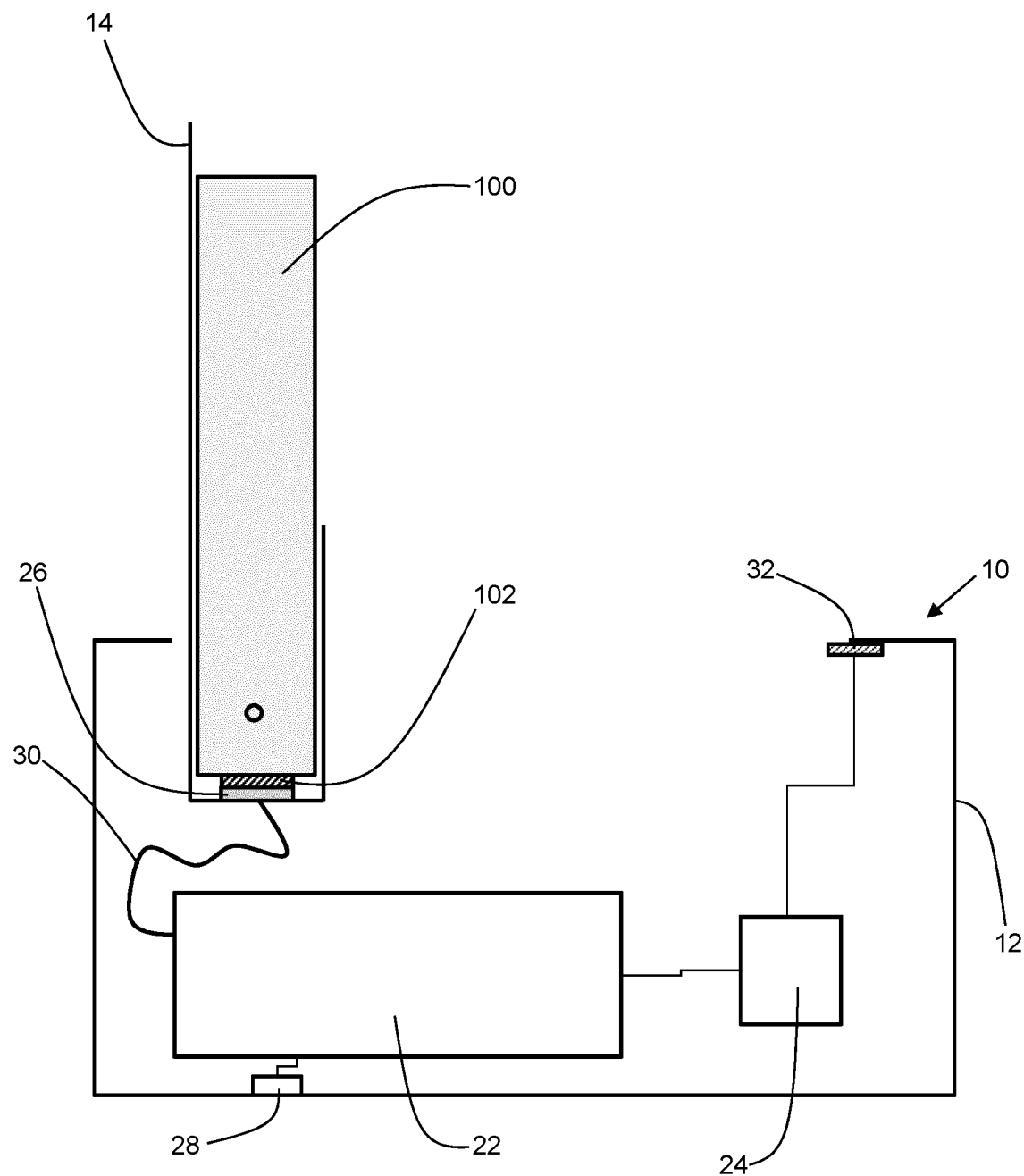
FIG. 2 shows a cross-sectional view of the case of FIG. 1 with the holder in the docking position and an aerosol-generating device received by the holder.

FIGS. 1 and 2 show a cross-sectional view of a case 10 for an aerosol-generating device 100 in accordance with a first embodiment of the present invention. The case 10 comprises a case housing 12 and a holder 14 movably coupled to the case housing 12. The holder 14 may receive an aerosol-generating device 100, as shown in FIG. 2.

The holder 14 is coupled to the case housing 12 by a hinge 20. The holder 14 and the hinge 20 are arranged such that the holder 14 may be rotated through an angle of about 90 degrees with respect to the case housing 12 between a closed position shown in FIG. 1 and a docking position shown in FIG. 2. In the docking position the case 10 may be positioned on a surface so that the holder 14 extends in the vertical direction and facilitates use of the case 10 as a docking station for an aerosol-generating device 100. This orientation of the case 10 is shown in the perspective view of the case 10 in FIG. 4.

The case 10 also comprises a case power supply 22, a controller 24, and a case electrical connector 26. The case power supply 22 comprises a rechargeable battery. A charging connector 28 in the form of a micro-USB connector allows the case 10 to receive power from an external power source for recharging the case power supply 22.

The case electrical connector 26 is positioned at an end of the holder 14 and is connected to the case power supply 22 by a flexible connector 30. The flexible connector 30 comprises a ribbon cable and accommodates movement of the holder 14 between the docking position and the closed position. When an aerosol-generating device 100 is received within the holder 14 as shown in FIG. 2, a device electrical connector 102 of the aerosol-generating device 100 contacts the case electrical connector 26. To facilitate use of the case 10 as a docking station for the aerosol-generating device 100, the case control circuitry 24 is configured to control a supply of power from the case power supply 22 to the aerosol-generating device 100 via the flexible connector 30 and the case electrical connector 26 when the holder 14 is in both the closed position and the docking position. The power supplied to the aerosol-generating device 100 may be used to charge a device power supply of the aerosol-generating device 100.

The case 10 also comprises a sensor 32 positioned on the case housing 12 adjacent to the holder 14. The sensor 32 comprises an optical proximity sensor arranged to sense whether the holder 14 is in the docking position or the closed position. The sensor 32 generates a signal indicative of the position of the holder 14 and the controller 24 is arranged to receive the signal from the sensor 32.

Figure 4:
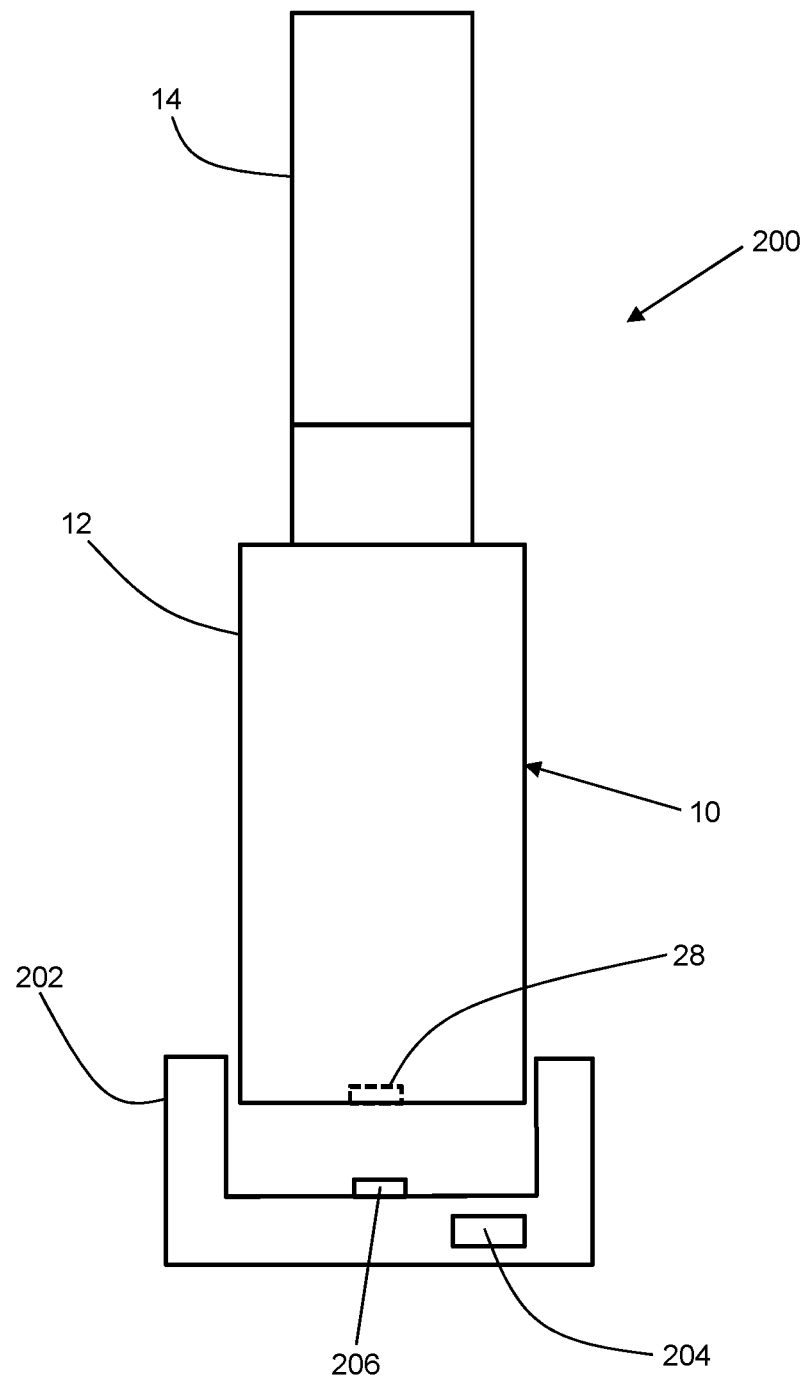
FIG. 4 shows an end view of a charging system comprising the case of FIG. 1 and a charging cradle.

FIG. 4 shows an end view of a charging system 200 comprising the case 10 of FIG. 1 and a charging cradle 202. The case 10 is shown with the holder 14 in the docking position and the case housing 12 partially inserted into the charging cradle 202. The charging cradle 202 comprises a charging cradle power supply connector 204 for receiving power from an external power supply, such as a mains power supply. The charging cradle 202 also comprises a charging cradle electrical connector 206 arranged to connect with the charging connector 28 of the case 10 when the case 10 is received within the charging cradle 202. The charging cradle 202 is configured to supply electrical power received by the charging cradle power supply connector 204 from an external power supply to the case 10 by the charging cradle electrical connector 206.

The controller 24 is configured to supply power received from the charging cradle 202 to the case power supply 22 when the signal from the sensor 32 is indicative of the holder 14 being in the closed position. The power supplied to the case power supply 22 recharges the case power supply 22.

When the signal from the sensor 32 is indicative of the holder 14 being the docking position, the controller 24 supplies power received from the charging cradle 202 directly to the aerosol-generating device 100 received within the holder 14 for recharging the device power supply of the aerosol-generating device 100. Supplying the power received from the charging cradle 202 directly to the aerosol-generating device 100 when the holder 14 is in the docking position bypasses the case power supply 22, which may reduce wear on the case power supply 22.

Figure 3:
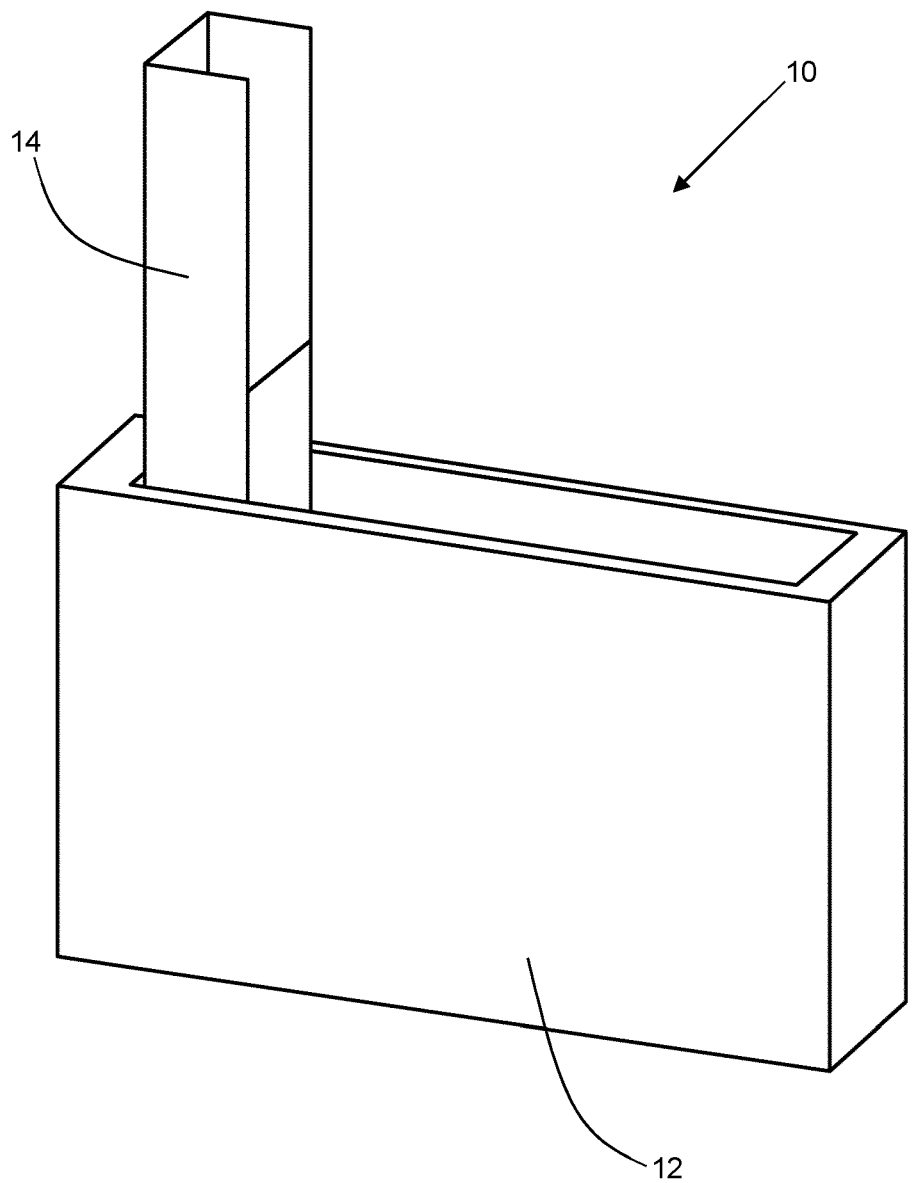
FIG. 3 shows a perspective view of the case of FIG. 1 with the holder in the docking position.
Figure 5:
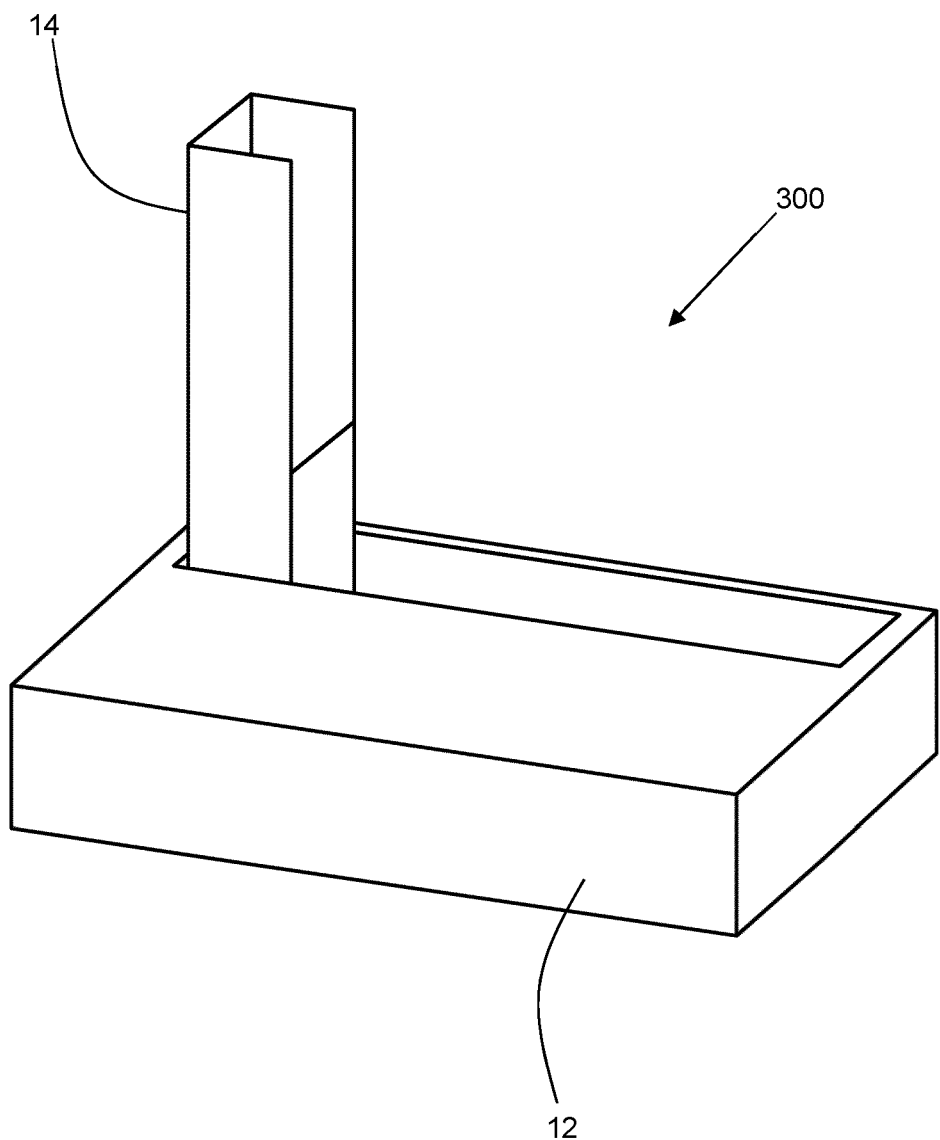
FIG. 5 shows a perspective view of a case in accordance with a second embodiment of the present invention and with the holder in the docking position.

FIG. 5 shows a perspective view of a case 300 according to a second embodiment of the present invention. The case 300 is substantially the same as the case 10 of FIG. 1, except for the positioning of the holder 14 with respect to the case housing 12. Instead of the holder 14 being positioned at a side of the case housing 12 (FIG. 3), the holder 14 of the case 300 is arranged at a front of the case housing 12 (FIG. 5). Due to the rectangular cross-sectional shape of the case housing 12, the configuration shown in FIG. 5 may be more stable than the configuration shown in FIG. 3 when used as a docking station, particularly when the case 300 is used as a docking station without a cradle to provide additional support to the case 300.

FIGS. 6 to 10 show a cross-sectional view of a case 400 according to a third embodiment of the present invention. The case 400 is similar to the case 10 of FIG. 1 and like reference numerals are used to designate like parts. The electrical components of the case 400 and their operation are identical to those of the case 10 of FIG. 1. The case 400 differs from the case 10 by the attachment of the holder 14 to the case housing 12.

The case 400 comprises a linkage 402 connecting the holder 14 to the case housing 12. The linkage 402 comprises a pin 404 at a first end of the linkage 402, the pin 404 slidably received within a slot 406 defined by the case housing 12. The holder 14 is pivotably connected to a second end of the linkage 402 by a hinge 420. The linkage 402 comprises a first portion 408 defining the first end of the linkage 402 and a second portion 410 defining the second end of the linage 402. The second portion 410 is rotatable with respect to the first portion 408.

Figure 6:
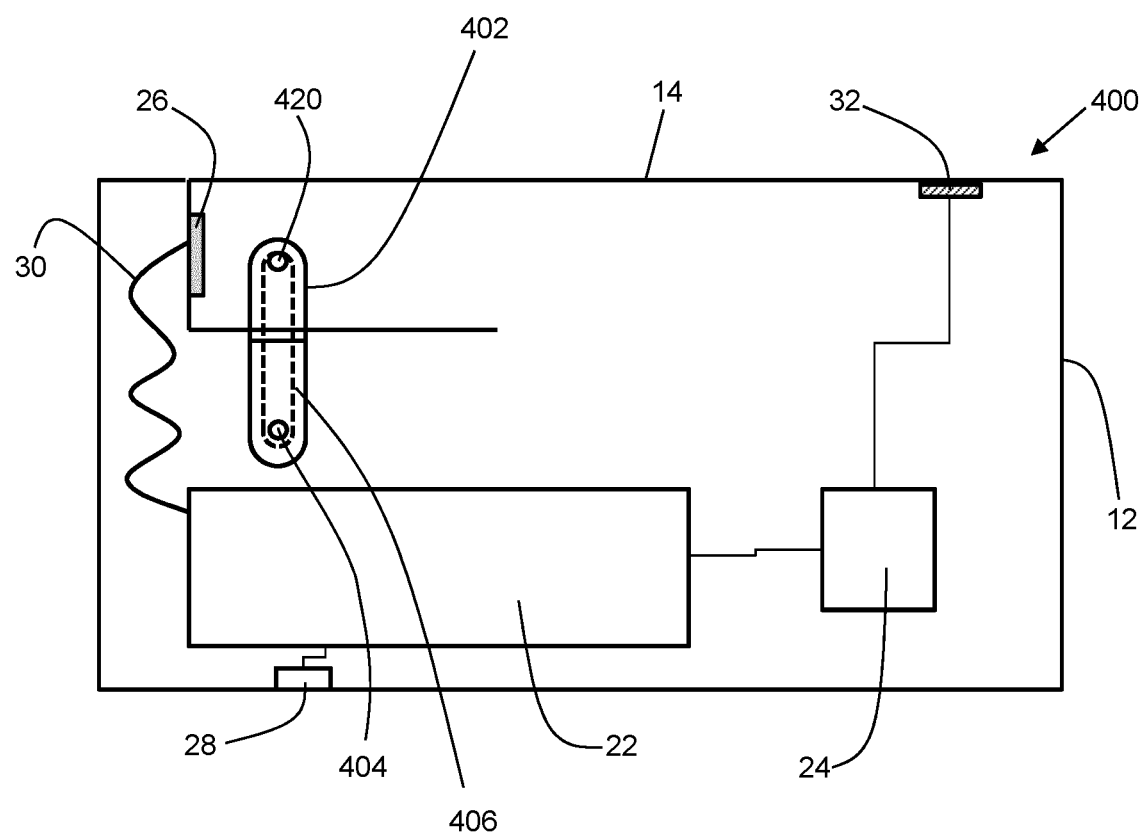
FIG. 6 shows a cross-sectional view of a case in accordance with a third embodiment of the present invention and with the holder in the closed position.
Figure 7:
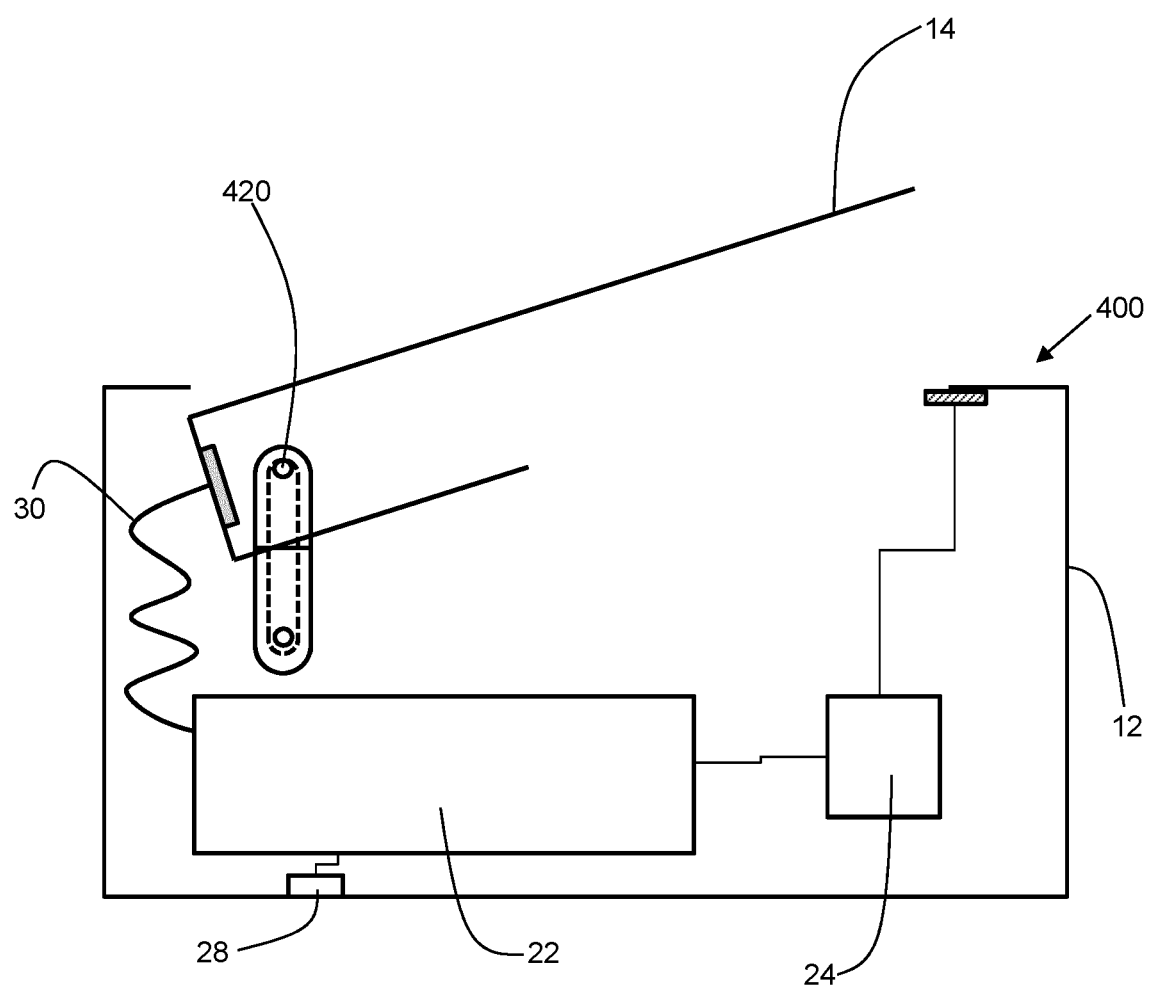
FIG. 7 shows a cross-sectional view of the case of FIG. 6 with the holder in a first open position.

From the closed position shown in FIG. 6, the holder 14 may be rotated about the hinge 420 into a first open position shown in FIG. 7. In the first open position, an aerosol-generating device may be inserted into the holder 14 or removed from the holder 14.

Figure 8:
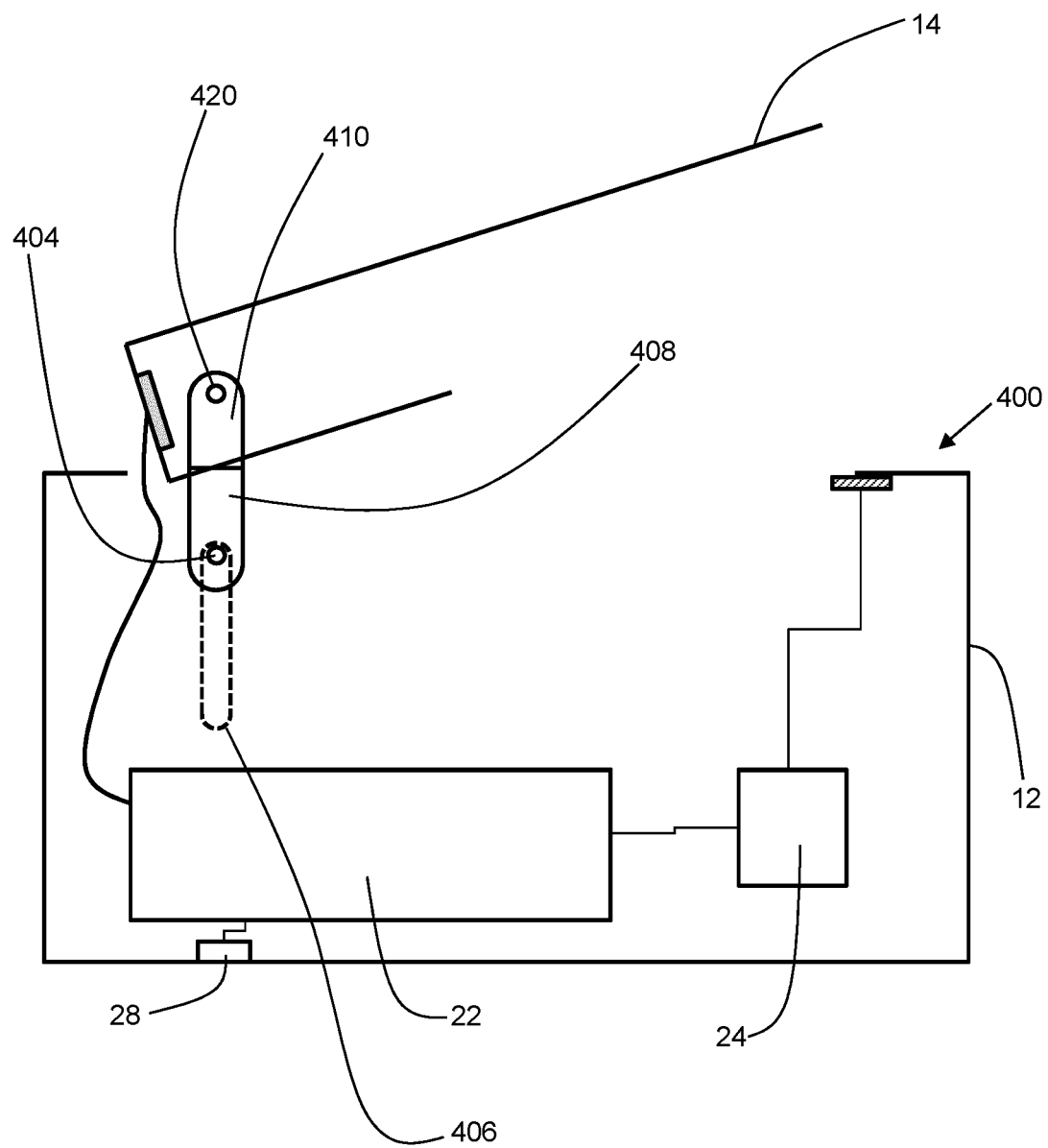
FIG. 8 shows a cross-sectional view of the case of FIG. 6 with the holder in a second open position.

From the first open position shown in FIG. 7, the pin 404 of the linkage 402 may be moved along the slot 406 to move the holder 14 into a second open position shown in FIG. 8. In the second open position, the holder 14 is positioned substantially outside of the case housing 12.

Figure 9:
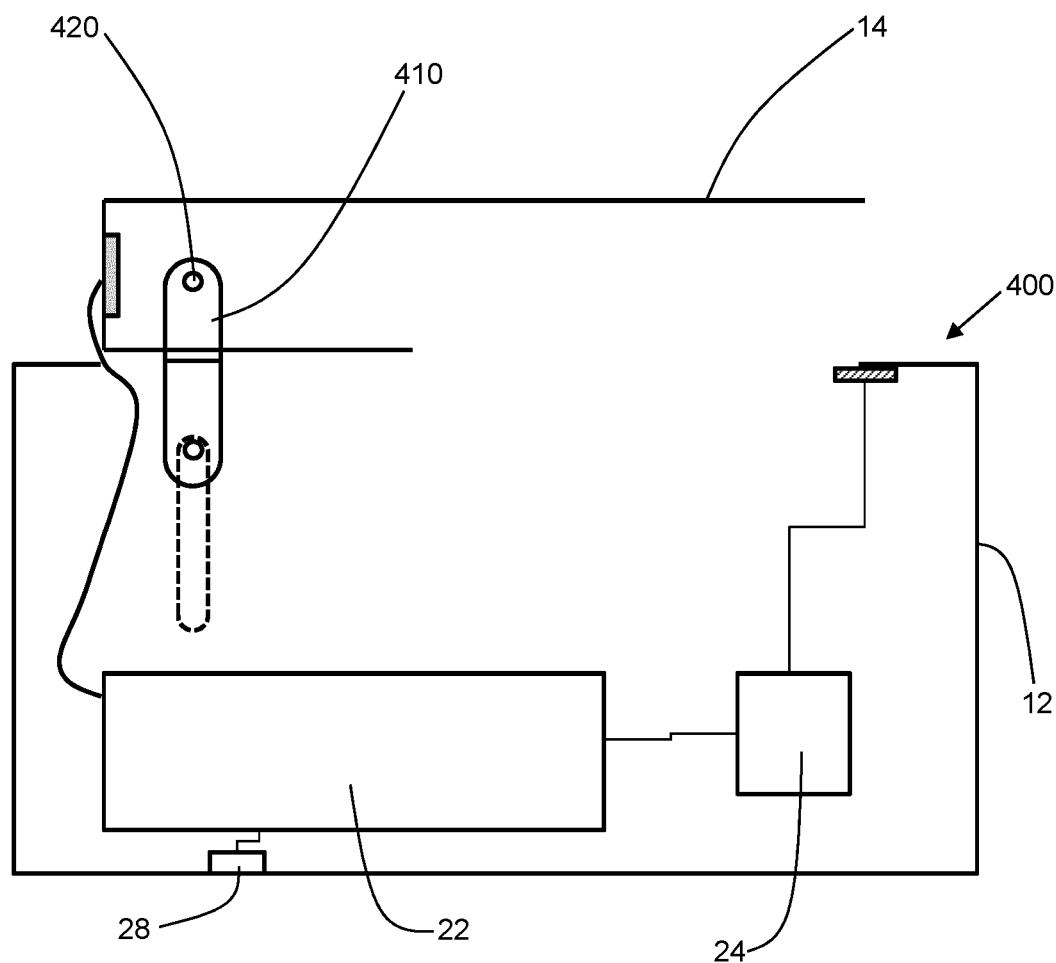
FIG. 9 shows a cross-sectional view of the case of FIG. 6 with the holder in a third open position.

From the second open position shown in FIG. 8, the holder 14 may be rotated about the hinge 420 into a third open position shown in FIG. 9. In the third open position, the holder 14 is substantially parallel to the case housing 12.

Figure 10:
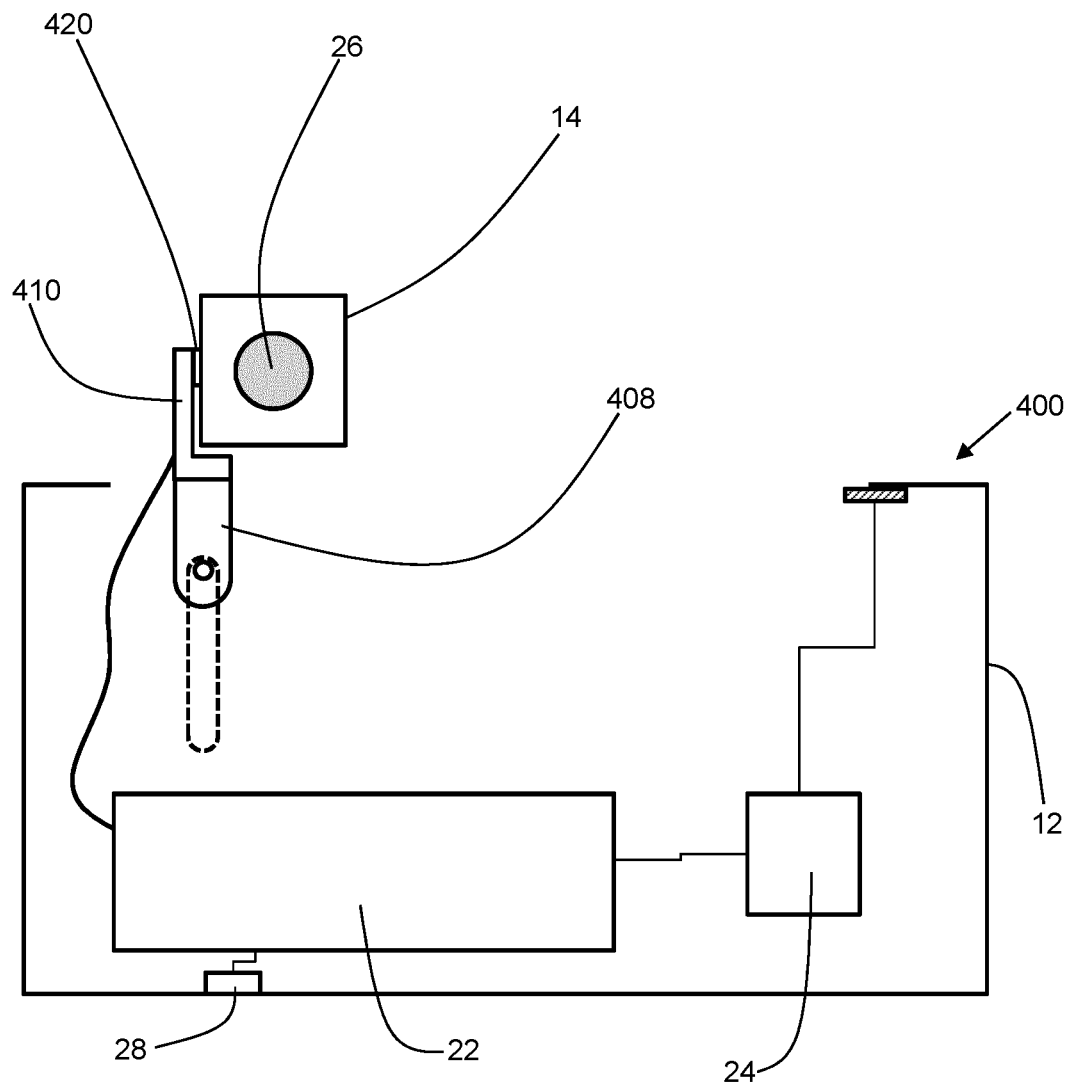
FIG. 10 shows a cross-sectional view of the case of FIG. 6 with the holder in the docking position.

From the third open position shown in FIG. 9, the second portion 410 of the linkage 402 may be rotated with respect to the first portion 408 of the linkage 402 to rotate the holder 14 through an angle of about 90 degrees with respect to the case housing 12 into the docking position shown in FIG. 10.

FIGS. 11 to 14 show a cross-sectional view of a case 500 according to a fourth embodiment of the present invention. The case 500 is similar to the case 400 of FIG. 6 and the case 10 of FIG. 1. Like reference numerals are used to designate like parts. The electrical components of the case 500 and their operation are identical to those of the case 10 of FIG. 1. The case 500 differs from the case 400 by the configuration of the linkage connecting the holder 14 to the case housing 12.

The case 500 comprises a linkage 502 connecting the holder 14 to the case housing 12. The linkage 502 comprises a pin 504 at a first end of the linkage 502, the pin 504 slidably and rotatably received within a slot 506 defined by the case housing 12. The holder 14 is pivotably connected to a second end of the linkage 502 by a ball joint. The ball joint comprises a socket portion 508 attached to the holder 14 and a ball portion 510 formed at the second end of the linkage 502. The ball portion 510 is rotatably received within the socket portion 508.

Figure 11:
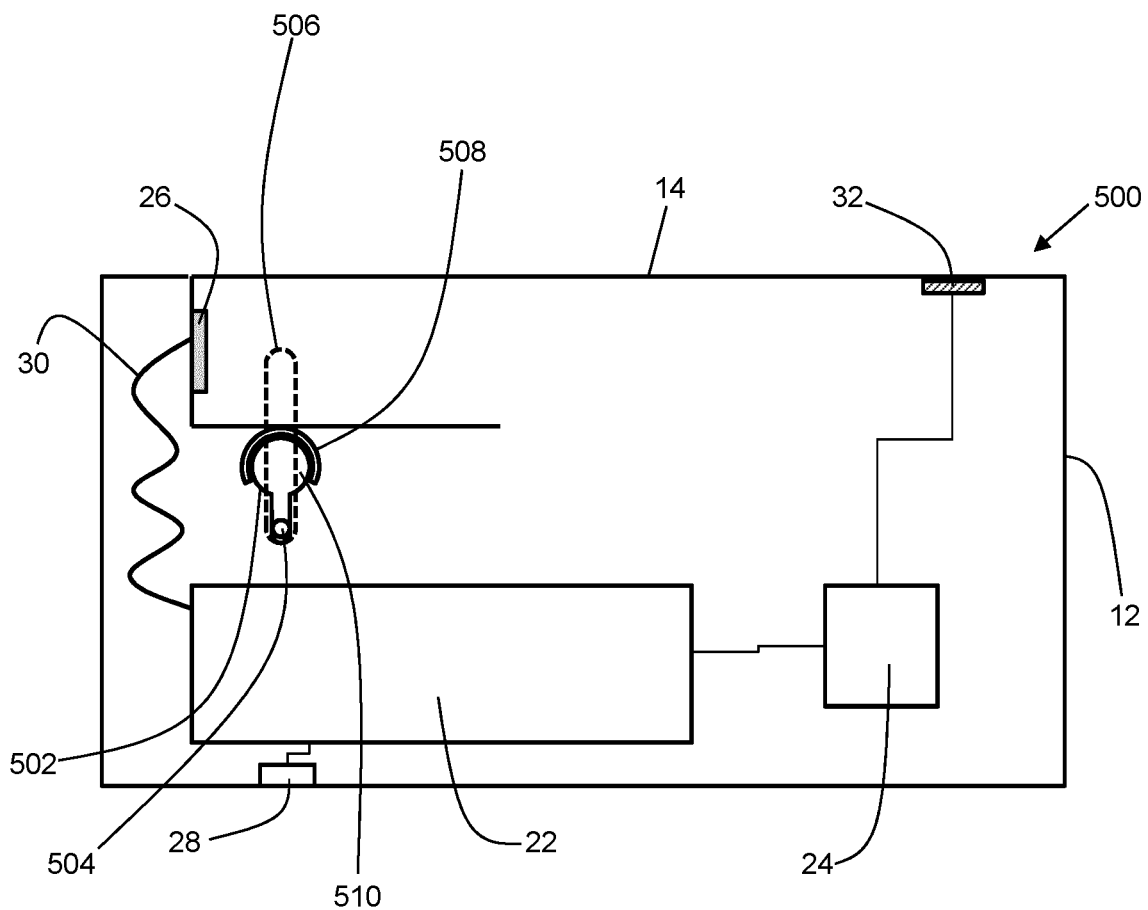
FIG. 11 shows a cross-sectional view of a case in accordance with a fourth embodiment of the present invention and with the holder in the closed position.
Figure 12:
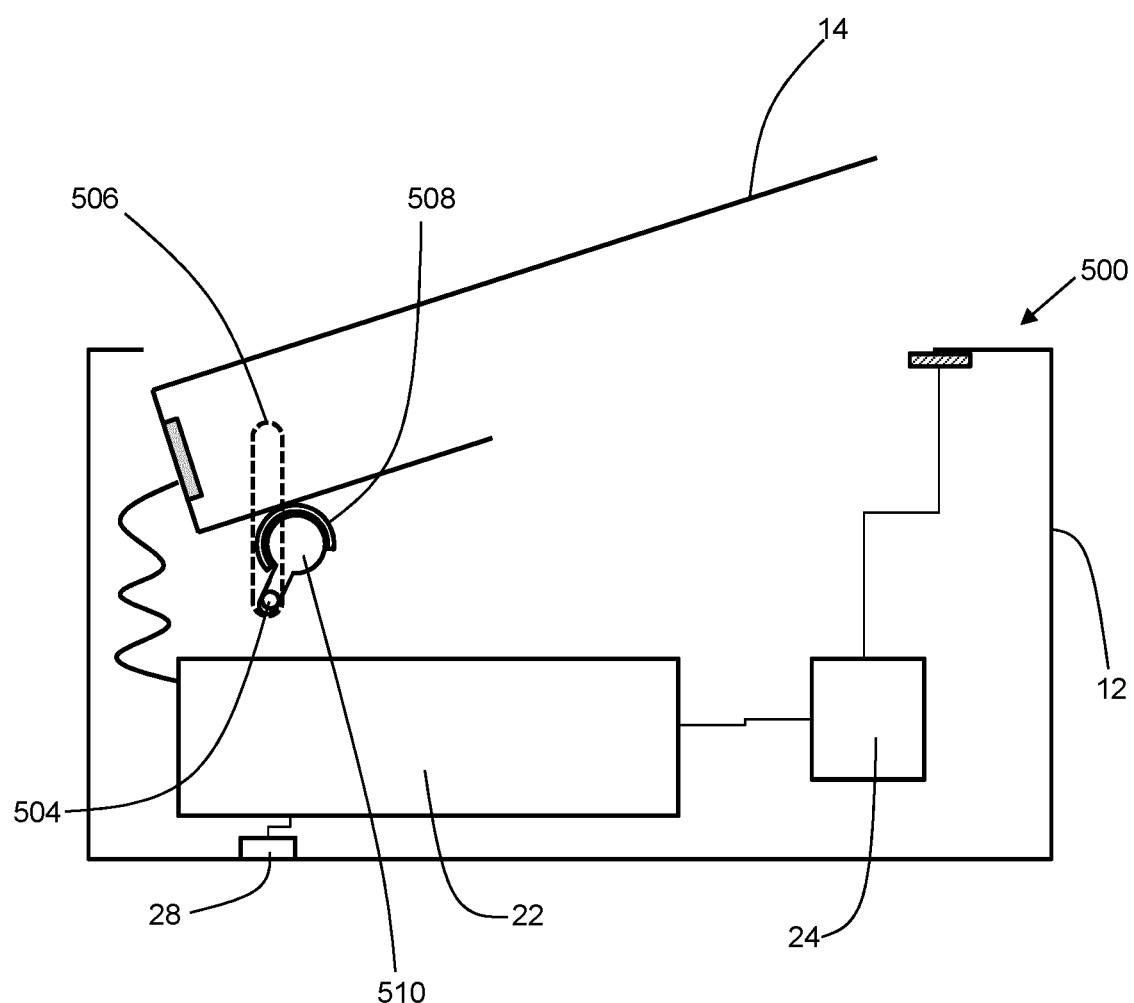
FIG. 12 shows a cross-sectional view of the case of FIG. 11 with the holder in a first open position.

From the closed position shown in FIG. 11, the socket portion 508 may be rotated about the ball portion 510 and the pin 504 may be rotated within the slot 506 to rotate the holder 14 into a first open position shown in FIG. 12. In the first open position, an aerosol-generating device may be inserted into the holder 14 or removed from the holder 14.

Figure 13:
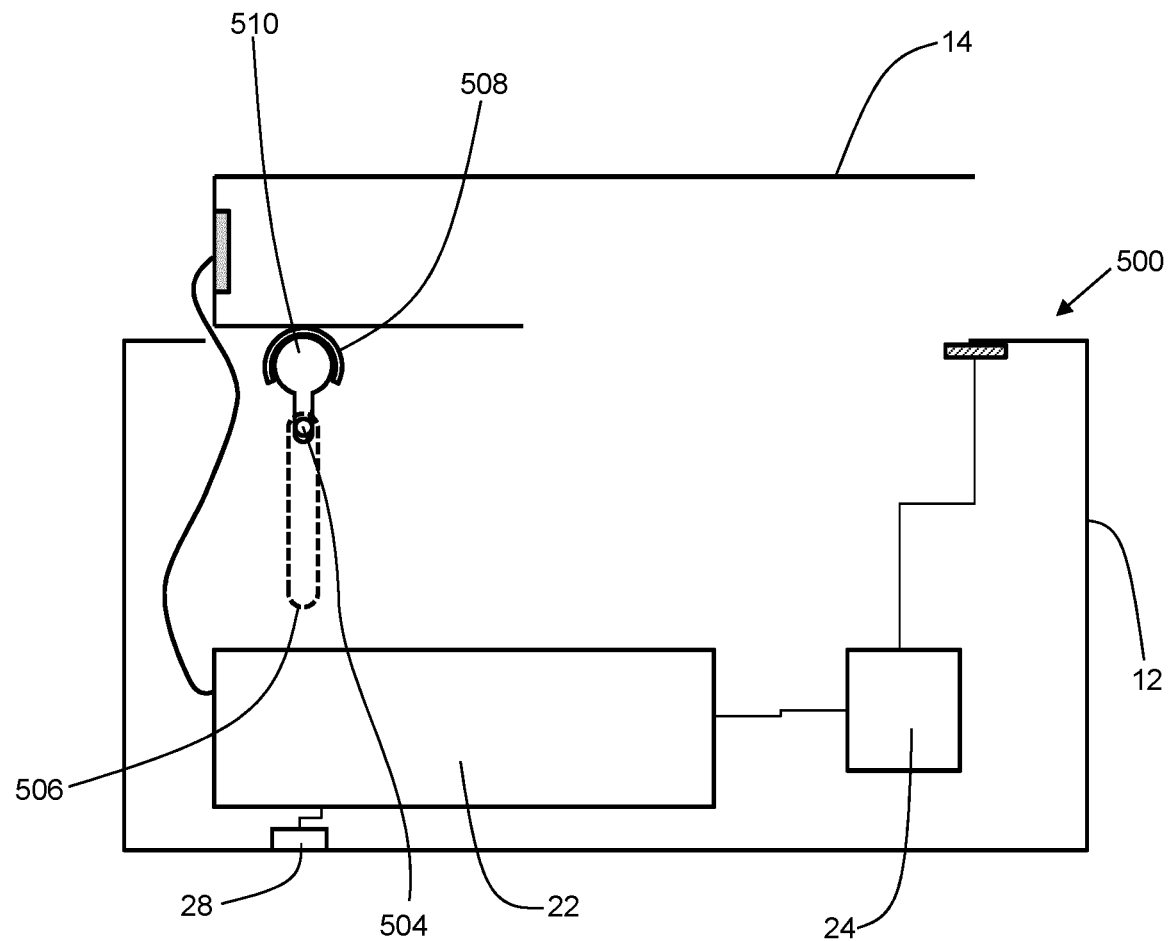
FIG. 13 shows a cross-sectional view of the case of FIG. 11 with the holder in a second open position.

From the first open position shown in FIG. 12 the socket portion 508 may be rotated about the ball portion 510 and the pin 504 may be rotated within the slot 506 and moved along the slot 506 to move the holder 14 into a second open position shown in FIG. 13. In the second open position, the holder 14 is positioned substantially outside of the case housing 12 and extends substantially parallel to the case housing 12.

Figure 14:
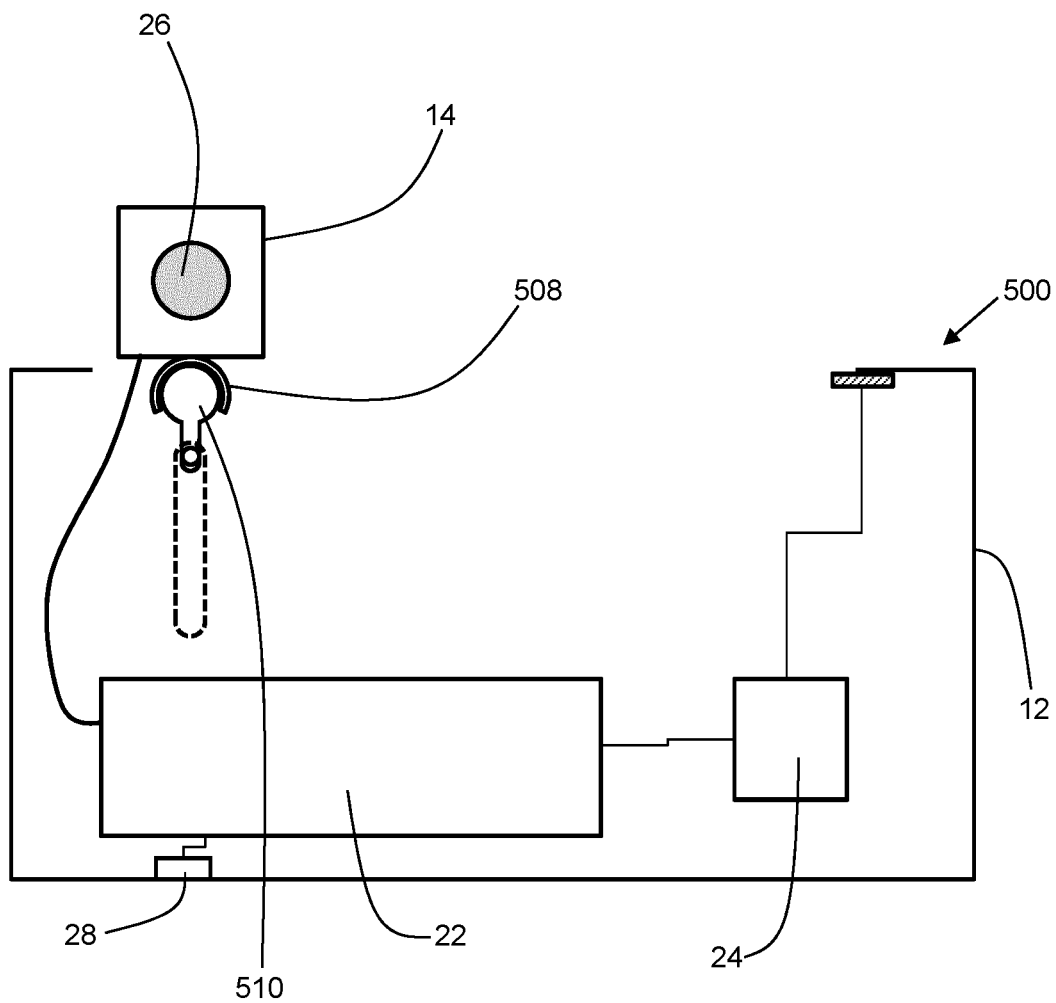
FIG. 14 shows a cross-sectional view of the case of FIG. 11 with the holder in the docking position.

From the second open position shown in FIG. 13, the socket portion 508 may be rotated about the ball portion 510 to rotate the holder 14 through an angle of about 90 degrees with respect to the case housing 12 into the docking position shown in FIG. 14.

Figure 15:
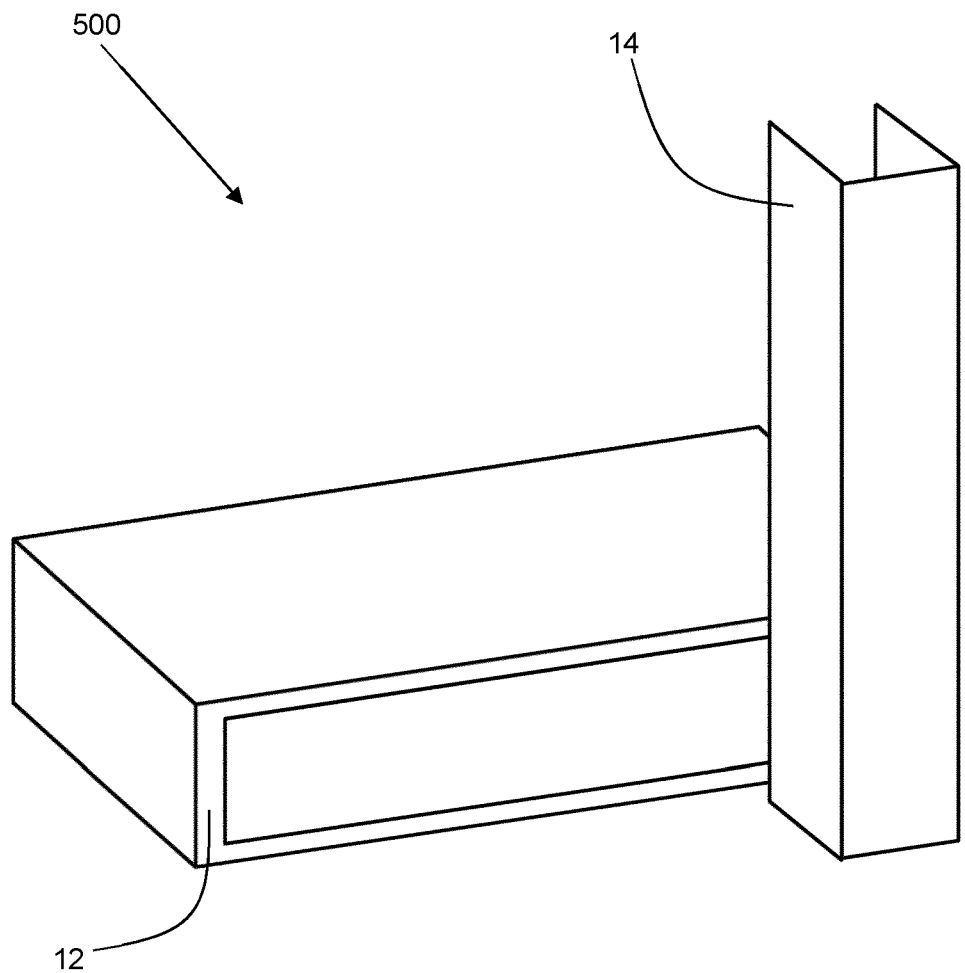
FIG. 15 shows a perspective view of the case of FIG. 11 with the holder in the docking position.

FIG. 15 shows a perspective view of the case 500 with the holder 14 in the docking position. It will be appreciated that the case 400 of FIG. 6 has the same configuration when the holder 14 is in the docking position.

The invention claimed is:

1. A case for an aerosol-generating device, the case comprising:
   a case housing;
   a holder configured to receive an aerosol-generating device, wherein the holder is movable with respect to the case housing between a closed position in which removal of the aerosol-generating device from the holder is prevented and a docking position in which the aerosol-generating device is removable from the holder;
   a case power supply disposed within the case housing;
   a case electrical connector configured to supply power to the aerosol-generating device when the aerosol-generating device is received within the holder;
   a charging connector configured to receive power from an external power supply;
   a sensor arranged to sense a position of the holder and to generate a signal indicative of the position of the holder; and
   a controller configured to:
      receive the signal from the sensor,
      supply power received by the charging connector from the external power supply to the case power supply when the signal is indicative of the holder being in the closed position, and supply power received by the charging connector from the external power supply to the case electrical connector when the signal is indicative of the holder being in the docking position.

2. The case according to claim 1, wherein the holder is further configured to rotate through an angle of between 80 degrees and 110 degrees with respect to the case housing when the holder moves between the closed position and the docking position.

3. The case according to claim 1,
further comprising a hinge,
wherein the holder is rotatable about the hinge with respect to the case housing.

4. The case according to claim 3,
wherein the holder is connected to the case housing by the hinge, and
wherein the holder is moveable about the hinge between the docking position and the closed position.

5. The case according to claim 1,
further comprising a linkage having a first end and a second end,
wherein the linkage is movably connected to the case housing at the first end of the linkage, and
wherein the holder is pivotably connected to the second end of the linkage.

6. The case according to claim 5, wherein the first end of the linkage is slidably connected to the case housing.

7. The case according to claim 5, wherein the holder is connected to the second end of the linkage by a hinge.

8. The case according to claim 5,
wherein the linkage comprises a shaft, the shaft comprising a first shaft portion defining the first end of the linkage and a second shaft portion defining the second end of the linkage, and
wherein the second shaft portion is rotatably connected to the first shaft portion.

9. The case according to claim 5, wherein the holder is connected to the second end of the linkage by at least one of a ball joint and a universal joint.

10. The case according to claim 1, wherein the case electrical connector is further configured to supply power from the case power supply to the aerosol-generating device when the aerosol-generating device is received within the holder and when the holder is in each of the docking position and the closed position.

11. The case according to claim 1,
wherein the case electrical connector is disposed on the holder, and
wherein the case further comprises a flexible connector providing an electrical connection between the case electrical connector and the case power supply.

12. The case according to claim 1, wherein the holder is rotatable with respect to the case housing into an open position between the closed position and the docking position.

13. A charging system, comprising:
a case according to claim 1; and
a charging cradle arranged to receive at least part of the case, the charging cradle comprising:
a charging cradle power supply connector configured to receive power from an external power supply, and
a charging cradle electrical connector configured to supply power received by the charging cradle power supply connector from an external power supply to the charging connector of the case when at least part of the case is received within the charging cradle.

* * * * *